US010817884B2

(12) United States Patent
Reeves (10) Patent No.: US 10,817,884 B2
(45) Date of Patent: Oct. 27, 2020

(54) BUILDING TOPIC-ORIENTED AUDIENCES

(71) Applicant: Google LLC, Mountain View, CA (US)

(72) Inventor: Damian Reeves, Menlo Park, CA (US)

(73) Assignee: Google LLC, Mountain View, CA (US)

( * ) Notice: Subject to any disclaimer, the term of this patent is extended or adjusted under 35 U.S.C. 154(b) by 1108 days.

(21) Appl. No.: 14/273,104

(22) Filed: May 8, 2014

(65) Prior Publication Data

US 2018/0240135 A1 Aug. 23, 2018

(51) Int. Cl.
*G06Q 10/00* (2012.01)
*G06Q 30/02* (2012.01)
*G06F 16/9535* (2019.01)

(52) U.S. Cl.
CPC ..... *G06Q 30/0201* (2013.01); *G06F 16/9535* (2019.01)

(58) Field of Classification Search
None
See application file for complete search history.

(56) References Cited

U.S. PATENT DOCUMENTS

| 8,166,013 | B2* | 4/2012 | Bandaru | G06F 40/258 |
| | | | | 707/705 |
| 9,378,065 | B2* | 6/2016 | Shear | G06F 40/00 |
| 2003/0126136 | A1* | 7/2003 | Omoigui | H04L 29/06 |
| 2010/0070448 | A1* | 3/2010 | Omoigui | H01L 27/14647 |
| | | | | 706/47 |
| 2010/0094875 | A1* | 4/2010 | Harrison | G06F 16/355 |
| | | | | 707/741 |
| 2010/0169301 | A1* | 7/2010 | Rubanovich | G06F 16/951 |
| | | | | 707/709 |
| 2010/0228733 | A1* | 9/2010 | Harrison | G06F 16/31 |
| | | | | 707/739 |
| 2011/0246267 | A1* | 10/2011 | Williams | G06Q 30/02 |
| | | | | 705/14.4 |
| 2011/0258049 | A1* | 10/2011 | Ramer | G06Q 30/0273 |
| | | | | 705/14.66 |
| 2012/0259871 | A1* | 10/2012 | Holmes | G06Q 30/0242 |
| | | | | 707/753 |
| 2012/0265610 | A1* | 10/2012 | Shama | G06F 16/951 |
| | | | | 705/14.49 |

(Continued)

OTHER PUBLICATIONS

Hale, Nina, Sep. 21, 2012, Google Analytics Retargeting with "Smart Pixel", ninahal.com, p. 1-4.*

*Primary Examiner* — Joseph M Waesco (74) *Attorney, Agent, or Firm* — Fish & Richardson P.C.

(57) ABSTRACT

Methods, systems, and apparatus include computer programs encoded on a computer-readable storage medium for creating and querying for audience data. A method includes: receiving data associated with each firing of a pixel as a result of a display of a publisher resource, wherein the data includes an identifier for the publisher, a URL associated with the resource, and a user identifier associated with a user device on which the resource was displayed; determining for each pixel firing one or more topics associated with a given resource; storing the user identifier in association with the determined one or more topics in an audience data structure; receiving a query to identify a segment of the audience; identifying one or more topics in the audience data structure based at least in part on terms of the query; and identifying user identifiers that are in an audience segment defined by the query.

15 Claims, 4 Drawing Sheets

(56) References Cited

U.S. PATENT DOCUMENTS

| | | | |
|---|---|---|---|
| 2013/0006771 A1* | 1/2013 | Parikh | G06Q 30/0241 |
| | | | 705/14.57 |
| 2014/0058831 A1* | 2/2014 | Duva | H04M 3/51 |
| | | | 705/14.45 |
| 2014/0172504 A1* | 6/2014 | Duva | G06Q 30/0242 |
| | | | 705/7.31 |
| 2014/0279032 A1* | 9/2014 | Roever | G06Q 30/0267 |
| | | | 705/14.64 |
| 2014/0282634 A1* | 9/2014 | Phan | H04N 21/2547 |
| | | | 725/1 |
| 2014/0282716 A1* | 9/2014 | Phan | H04L 67/1097 |
| | | | 725/34 |
| 2014/0314215 A1* | 10/2014 | Duva | H04M 3/51 |
| | | | 379/88.01 |
| 2014/0344718 A1* | 11/2014 | Rapaport | H04L 51/32 |
| | | | 715/753 |
| 2015/0071427 A1* | 3/2015 | Kelley | G06Q 30/0201 |
| | | | 379/265.09 |

* cited by examiner

BUILDING TOPIC-ORIENTED AUDIENCES

BACKGROUND

This specification relates to information presentation.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Slots can be allocated to content sponsors through a reservation system or an auction. For example, content sponsors can provide bids specifying amounts that the sponsors are respectively willing to pay for presentation of their content. In turn, a reservation can be made or an auction can be performed, and the slots can be allocated to sponsors according, among other things, to their bids and/or the relevance of the sponsored content to content presented on a page hosting the slot or a request that is received for the sponsored content.

SUMMARY

In general, one innovative aspect of the subject matter described in this specification can be implemented in methods that include a method for creating and querying for audience data. A method includes: for a given publisher of one or more resources, receiving data associated with each firing of a pixel as a result of a display of a resource of the one or more resources, wherein the data includes an identifier for the publisher, a URL associated with the resource, and a user identifier associated with a user device on which the resource was displayed; determining for each pixel firing one or more topics associated with a given resource; storing the user identifier in association with the determined one or more topics in an audience data structure for the publisher, the audience data structure being indicative of an audience that has been presented content of the publisher on the one or more resources; receiving a query from the publisher to identify a segment of the audience; classifying the query including identifying one or more topics in the audience data structure based at least in part on terms of the query; and identifying user identifiers that are in an audience segment defined by the query based on the classifying including identifying user identifiers associated with the identified one or more topics.

In general, another aspect of the subject matter described in this specification can be implemented in computer program products. A computer program product is tangibly embodied in a computer-readable storage device and comprises instructions. The instructions, when executed by a processor, cause the processor to: for a given publisher of one or more resources, receive data associated with each firing of a pixel as a result of a display of a resource of the one or more resources, wherein the data includes an identifier for the publisher, a URL associated with the resource, and a user identifier associated with a user device on which the resource was displayed; determine for each pixel firing one or more topics associated with a given resource; store the user identifier in association with the determined one or more topics in an audience data structure for the publisher, the audience data structure being indicative of an audience that has been presented content of the publisher on the one or more resources; receive a query from the publisher to identify a segment of the audience; classify the query including identifying one or more topics in the audience data structure based at least in part on terms of the query; and identify user identifiers that are in an audience segment defined by the query based on the classifying including identifying user identifiers associated with the identified one or more topics.

In general, another aspect of the subject matter described in this specification can be implemented in systems. A system includes one or more processors and one or more memory elements including instructions. The instructions, when executed, cause the one or more processors to: for a given publisher of one or more resources, receive data associated with each firing of a pixel as a result of a display of a resource of the one or more resources, wherein the data includes an identifier for the publisher, a URL associated with the resource, and a user identifier associated with a user device on which the resource was displayed; determine for each pixel firing one or more topics associated with a given resource; store the user identifier in association with the determined one or more topics in an audience data structure for the publisher, the audience data structure being indicative of an audience that has been presented content of the publisher on the one or more resources; receive a query from the publisher to identify a segment of the audience; classify the query including identifying one or more topics in the audience data structure based at least in part on terms of the query; and identify user identifiers that are in an audience segment defined by the query based on the classifying including identifying user identifiers associated with the identified one or more topics.

These and other implementations can each optionally include one or more of the following features. At least one of the one or more resources can be a web resource. At least one of the one or more resources can be an application presented on a mobile device. Determining one or more topics associated with the resource can include receiving data as a result of the pixel firing that includes information for classifying the resource. Receiving data associated with each firing of the pixel can include receiving one or more of the title or a portion of the resource. Information gathered in response to the pixel firing can be received. The received information may have been extracted from a document object model associated with the resource. The one or more resources can be crawled and a representation of a crawled resource can be stored. Determining one or more topics associated with a resource can include evaluating the stored representation of the crawled resource. Determining for each pixel firing one or more topics associated with a given resource can include identifying a semantic space that includes a plurality of topic clusters, each topic cluster including one or more topics that are within a predetermined distance in the semantic space. One or more topic clusters can be determined for the resource and the user identifier can be stored in association with the determined one or more topic clusters. Determining the one or more topic clusters can include determining a probability that the given resource should be associated with one of the determined one or more topic clusters and storing the user identifier in association with a specific topic cluster. Storing the user identifier can include storing the probability along with the user identifier in a given topic cluster. The probability can be used to determine whether to serve content to a user upon identifying a serving opportunity for the user associated with a specific user identifier in the audience occurs. Determining whether to serve can include adjusting a bid for use in an auction associated with the opportunity. Classifying the query can include determining one or more topic clusters in the semantic space based on terms of the query and determining users in the audience segment can include determining user identifiers that are associated with the determined one or more topic clusters. Receiving the query can include using the query to determine selection criteria for a campaign. Determining one or more topics and storing the user identifiers can be performed by an entity other than the publisher. The publisher can be an advertiser, the one or more web resources can be associated with a website of the advertiser, and the query can identify a behavior of a user that visited the website.

Particular implementations may realize none, one or more of the following advantages. A publisher can be provided with one or more user lists, with each user list including a list of users who have visited one or more resources of the publisher that are associated with a particular topic. A content campaign can be configured for a publisher, wherein the content campaign provides content to users who have visited resources of the publisher that are associated with a particular topic. A user list including users who have visited resources of a publisher pertaining to a particular topic can be provided to the publisher without requiring the publisher to classify the publisher resources.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A publisher can publish a set of one or more resources. When a publisher resource is displayed on a user device, a content server can receive data associated with a tag, smart pixel or other code item as a result of a display of the resource. The data can include an identifier for the publisher, a URL (Uniform Resource Locator) associated with the resource, and a user identifier associated with the user device/user that requested the resource. The content server can determine, e.g., for the pixel firing, one or more topics associated with the resource. The user identifier can be stored in association with the determined one or more topics in an audience data structure for the publisher. The content server can subsequently receive a query from the publisher to identify a segment of the audience, and in response to the query, the content server can identify one or more topics in the audience data structure based at least in part on terms of the query and can determine users that are in an audience segment defined by the query. For example, the content server can identify user identifiers associated with the identified one or more topics and can provide the user identifiers in response to the query.

For situations in which the systems discussed here collect information about users, or may make use of information about users, the users may be provided with an opportunity to control whether programs or features collect user information (e.g., information about a user's social network, social actions or activities, profession, demographics, a user's preferences, or a user's current location), or to control whether and/or how to receive content from a content server that may be more relevant to the user. In addition, certain data may be treated in one or more ways before it is stored or used, so that certain information about the user is removed. For example, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information about the user is collected and used by a content server.

Figure 1:
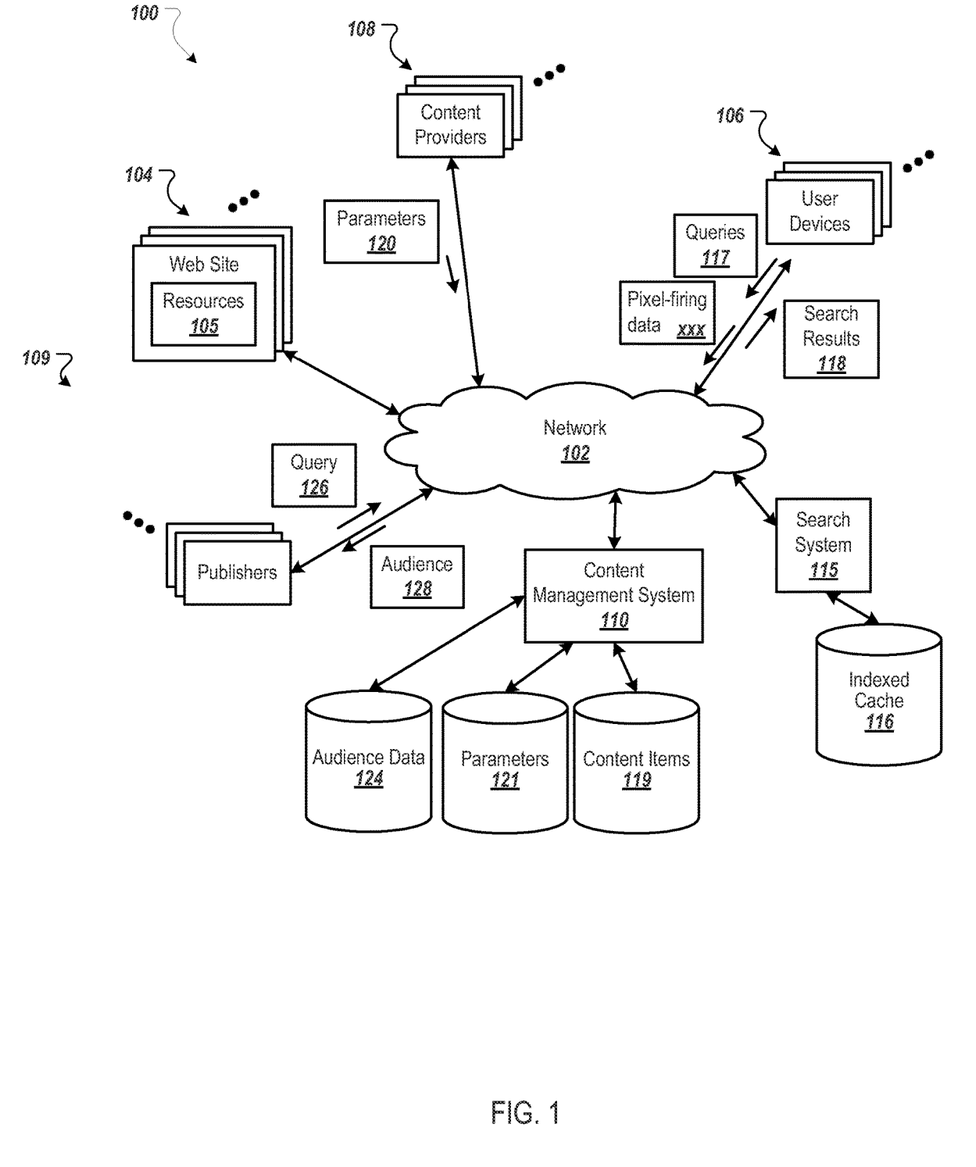
FIG. 1 is a block diagram of an example environment for presenting content.

FIG. 1 is a block diagram of an example environment 100 for presenting content. The example environment 100 includes a network 102, such as a local area network (LAN), a wide area network (WAN), the Internet, or a combination thereof. The network 102 connects websites 104, user devices 106, content providers 108, publishers 109, and a content management system 110. The example environment 100 may include many thousands of websites 104, user devices 106, content providers 108, and publishers 109. The content management system 110 may be used for selecting and providing content in response to requests for content. The content providers 108 can be, for example, advertisers. Other types of content providers are possible.

A website 104 includes one or more resources 105 associated with a domain name and hosted by one or more servers. An example website 104 is a collection of web pages formatted in hypertext markup language (HTML) that can contain text, images, multimedia content, and programming elements, such as scripts. Each website 104 can be maintained by a publisher 109, which is an entity that controls, manages and/or owns the website 104.

A resource 105 can be any data that can be provided over the network 102. A resource 105 can be identified by a resource address that is associated with the resource 105. Resources 105 include HTML pages, word processing documents, portable document format (PDF) documents, images, video, and news feed sources, to name only a few. The resources 105 can include content, such as words, phrases, videos, images and sounds, that may include embedded information (such as meta-information hyperlinks) and/or embedded instructions (such as scripts). Resources 105 can be associated with web sites 104 (as mentioned) and/or with other components associated with the environment 100, such as an application (e.g., mobile application).

A user device 106 is an electronic device that is under control of a user and is capable of requesting and receiving resources 105 over the network 102. Example user devices 106 include personal computers, tablet computers, mobile communication devices (e.g., smartphones), televisions, set top boxes, personal digital assistants and other devices that can send and receive data over the network 102. A user device 106 typically includes one or more user applications, such as a web browser, to facilitate the sending and receiving of data over the network 102. The web browser can interact with various types of web applications, such as a game, a map application, or an e-mail application, to name a few examples.

A user device 106 can request resources 105 from a website 104. In turn, data representing the resource 105 can be provided to the user device 106 for presentation by the user device 106. User devices 106 can also submit search queries 117 to the search system 115 over the network 102. In response to a search query 117, the search system 115 can, for example, access the indexed cache 116 to identify resources 105 that are relevant to the search query 117. The search system 115 identifies the resources 105 in the form of search results 118 and returns the search results 118 to the user devices 106 in search results pages. A search result 118 is data generated by the search system 115 that identifies a resource 105 that is responsive to a particular search query 117, and includes a link to the resource 105. An example search result 118 can include a web page title, a snippet of text or a portion of an image extracted from the web page, and the URL (Unified Resource Location) of the web page.

The data representing the resource 105 or the search results 118 can also include data specifying a portion of the resource 105 or search results 118 or a portion of a user display (e.g., a presentation location of a pop-up window or in a slot of a web page) in which other content (e.g., advertisements) can be presented. These specified portions of the resource or user display are referred to as slots or impressions. An example slot is an advertisement slot.

When a resource 105 or search results 118 are requested by a user device 106, the content management system 110 may receive a request for content to be provided with the resource 105 or search results 118. The request for content can include characteristics of one or more slots or impressions that are defined for the requested resource 105 or search results 118. For example, a reference (e.g., URL) to the resource 105 or search results 118 for which the slot is defined, a size of the slot, and/or media types that are available for presentation in the slot can be provided to the content management system 110. Similarly, keywords associated with a requested resource 105 or a search query 117 for which search results 118 are requested can also be provided to the content management system 110 to facilitate identification of content that is relevant to the resource 105 or search query 117. An identifier (e.g., cookie) associated with the user device 106 can be received with the request for content.

Based, for example, on data included in the request for content, the content management system 110 can select (e.g., from a content items data store 119) content items that are eligible to be provided in response to the request. One or more selected content items can be provided to the user device 106 in association with providing an associated resource 105 or search results 118. The provided content item(s) can be presented on the user device 106, in one or more respective slots.

The content management system 110 can, for example, select a content item having characteristics matching the characteristics of a given slot. As another example, content items having selection criteria (e.g., keywords) that match resource keywords in the search query 117 or keywords included in the search results 118 may be selected as eligible content items by the content management system 110. As yet another example, the content management system 110 can identify a content item in the content items datastore 119 that is associated with a keyword that matches a keyword included in a user profile associated with the requesting user device 106. The identified content item can be selected by the content management system 110 and provided to the requesting user device 106.

In some implementations, the content management system 110 can select content items based at least in part on results of an auction. For example, content providers 108 can provide bids specifying amounts that the content providers 108 are respectively willing to pay for presentation of their content items. In turn, an auction can be performed and the slots can be allocated to content providers 108 according, among other things, to their bids and/or the relevance of a content item to content presented on a page hosting the slot or a request that is received for the content item. For example, when a slot is being allocated in an auction, the slot can be allocated to the content provider 108 that provided the highest bid or a highest auction score (e.g., a score that is computed as a function of a bid and/or a quality measure). A quality score can be determined, for example, based on a quality of match between, for example, a keyword associated with a content item and keywords associated with a resource that includes the slot associated with the request. As another example, a quality score can be determined based on a quality of match between a keyword associated with a content item and keywords included in a user device profile associated with the requesting user device.

The content items provided to the requesting user device 106, and optionally user interactions (e.g., click-throughs or conversions) with the content items, can be logged by various logging mechanisms (e.g., using cookies or smart pixel callbacks), associated with the content management system 110, and stored in a historical traffic database 122, in association with an identity of the content sponsor (e.g., the relevant content provider 108 associated with a respective content item). In some implementations, such logging can be enabled by various user opt-in processes. Performance of particular keywords, content groups, and campaigns can be measured based on various performance metrics, such as cost per action (e.g., click or conversion), conversion length (e.g., number of clicks between initial impression and conversion), click through rate, etc.

A content provider 108 or content sponsor can create a content campaign associated with one or more content items using tools provided by the content management system 110. For example, the content management system 110 can provide one or more account management user interfaces for creating and managing content campaigns. The account management user interfaces can be made available to the content provider 108, for example, either through an online interface provided by the content management system 110 or as an account management software application installed and executed locally at a content provider's client device.

A content provider 108 can, using the account management user interfaces, provide campaign parameters 120 which define a content campaign. The content campaign can be created and activated for the content provider 108 according to the parameters 120 specified by the content provider 108. The campaign parameters 120 can be stored in a campaign database 121. Campaign parameters 120 can include, for example, a campaign name, a preferred content network for placing content, a budget for the campaign, start and end dates for the campaign, a schedule for content placements, content (e.g., creatives), bids, and selection criteria. Selection criteria can include, for example, a language, one or more geographical locations or websites, and/or one or more selection terms. The selection terms, can include, for example, one or more keywords. The selection terms can be used in evaluating when to serve content items in response to received requests for content.

A publisher 109 may desire to obtain audience data which represents users that have been presented content of the publisher 109 on one or more resources 105 associated with the publisher 109. The publisher 109 may, for example, desire to use an audience segment as selection criteria for a content campaign (e.g., a re-marketing campaign). For example, selection criteria for the content campaign can be used to determine whether to serve content to a user device 106 upon identifying a serving opportunity for the user device 106, such as when the serving opportunity is associated with a specific user identifier in the audience segment. As another example, audience data can be used for real-time bidding in response to requests for content or to customize content to be provided to a specific user/user device 106. As yet another example, information related to an audience segment can be sold or exchanged, such as in a data exchange marketplace. In summary, audience data can be exchanged, marketed or otherwise used to facilitate the delivery of relevant content to users/user devices 106 that are included in specified audience segments.

An audience segment can be specified by a definition that describes a characteristic (or plural characteristics) that are shared by each member in the audience segment. Each entry in the audience segment can include an identifier that identifies (either locally or globally) a specific user/user device that meets the definition. Audience segments can represent specific user-related information pertaining to predefined and/or automatically determined categories. For example, an audience segment may include data about one or more user identifiers that characterizes the user identifiers into a category (e.g., homeowner, craftsman, DVD renter, etc.) to allow content selection and presentation, for example, by publishers 109 or content providers 108.

A publisher 109 may publish many (e.g., hundreds, thousands) of resources 105 which may be presented on user devices 106. Categorizing each resource 105 according to one or more topics (e.g., for future generation of audience segments based on such topics) may be an expensive and time-consuming task for a publisher 109. Additionally, the publisher 109 may not know, at the time of classification, which topics may be of later interest for the publisher 109. Also, resource content and URLs or other resource identifiers can change over time and prior resource classifications can become out of date. A publisher 109 can use dynamic, automatic classification and audience segment generation features provided by the content management system 110 to access up-to-date audience segments associated with the resources 105 of the publisher 109. A content provider 108 may also use such services.

The content management system 110 can, for example, provide (or provide access to) a pixel, tag or callback code to a publisher 109. When a publisher resource 105 is displayed on a user device 106, the content management system 110 can receive data associated with a firing of the pixel (tag or call back code) as a result of a display of the resource 105. The received data can include, for example, an identifier for the publisher 109, a URL associated with the resource 105, and a user identifier associated with the user device 106.

The content management system 110 can determine, for the firing, one or more topics associated with the resource 105. The topics can be determined, for example, based on crawled data (e.g., data in the indexed cache 116 or other crawled data). As another example, the topics can be determined from data received as a result of the firing that includes information for classifying the resource 105. The content management system 110 can store the user identifier in association with the determined one or more topics in an audience data structure 124 for the publisher 109. Determining topics is discussed in more detail below.

The content management system 110 can subsequently receive a query 126 from the publisher 109 to identify a segment of the audience stored for the publisher 109 in the audience data structure 124. For example, the query 126 can be for an audience segment associated with one or more topics. In response to the query 126, the content management system 110 can identify one or more topics in the audience data structure 124 based at least in part on terms of the query 126 and can determine user/user device identifiers that are in an audience segment defined by the query 126 based on the classifying. For example, the content management system 110 can identify user/user device identifiers associated with the identified one or more topics and can provide an audience segment 128 that includes the identified user/user device identifiers in response to the query 126. The publisher 109 can use the audience segment 128, such as for determining selection criteria for a campaign or for some other purpose (e.g., planning, reporting, analysis).

Figure 2:
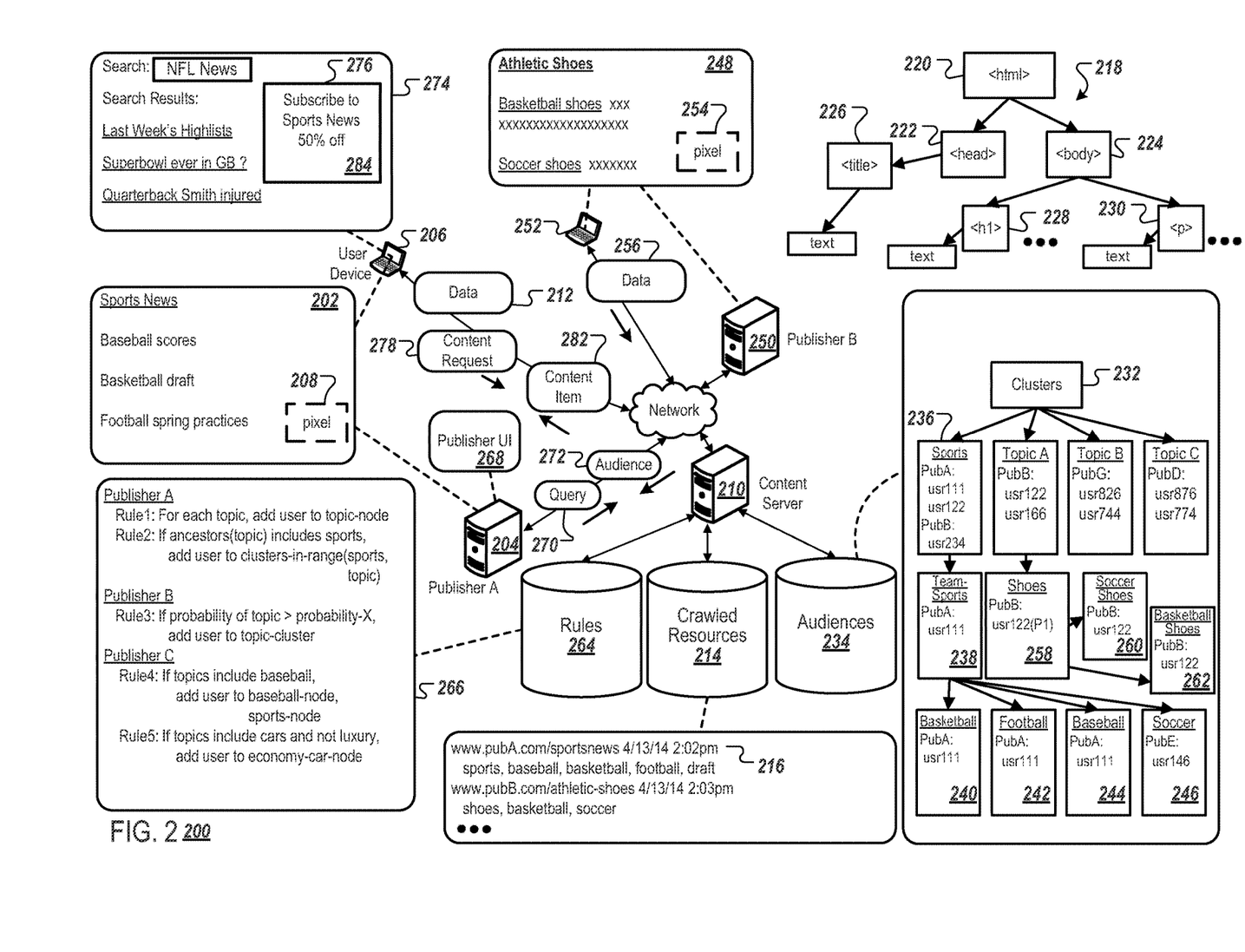
FIG. 2 is a block diagram of an example system for creating and querying for audience data.

FIG. 2 is a block diagram of an example system 200 for creating and querying for audience data. A publisher page 202 of a publisher 204 (e.g., "publisher A") is displayed on a user device 206. The publisher page 202 includes or is otherwise associated with a pixel 208. The pixel 208 can include, for example, executable code (e.g., script code). The pixel 208 can be provided by, for example, a content server 210. The publisher 204 can include the pixel 208 or a reference to the pixel 208 in the publisher page 202. The pixel 208 can be executed ("fire") in association with the rendering of the publisher page 202, such as after the publisher page 202 has been displayed on the user device 206. The firing of the pixel 208 can include, for example, execution of code associated with the pixel 208.

The content server 210 can receive data 212 in response to the firing of the pixel 208. The data 212 can include an identifier for the publisher 204, a URL associated with the publisher page 202, and a user/user device identifier associated with the user device 206. The content server 210 can, in response to receiving the data 212, determine one or more topics associated with the publisher page 202. The content server 210 can determine the one or more topics using one or more of various approaches. For example, the content server 210 can determine topics based on crawled data and/or the data 212.

The content server 210 can query a crawled resources repository 214 using the received URL associated with the publisher page 202. The crawled resources repository 214 can include representations of crawled resources. The content server 210 (or another server) can, for example, periodically crawl resources and store representations of the crawled resources in the crawled resources repository 214. The content server 210 can identify a stored representation 216 that is associated with the publisher page 202 and can evaluate the stored representation 216 to determine, for example, topics of "sports", "baseball", "basketball", "football", and "draft" that are associated with the publisher page 202.

The content server 210 can determine the one or more topics based on the data 212. In some implementations, data 212 includes, for example, one or more of the title or a portion of the publisher page 202. For example, firing of the pixel 208 can include identifying headers in the textual portion of the publisher page 202 having at least a certain level of significance (e.g., top-level headers, top-level and second-level headers). The identified headers can be included in the data 212. As another example, firing of the pixel 208 can include identifying a first number (e.g., three) of paragraphs of the publisher page 202 and including the identified paragraphs in the data 212. The content server 210 can evaluate, for example, the received title, headers, and/or paragraphs of the publisher page 202 to determine the one or more topics associated with the publisher page 202. For example, the title, headers, and paragraphs may include keywords of sports, baseball, basketball, and football and the content server 210 can determine the topics of sports, baseball, basketball, and football based on the keywords.

As another example, the content server 210 can determine the one or more topics based on the data 212. In some implementations, the data 212 includes information extracted from a document object model (DOM) associated with the publisher page 202. The DOM associated with the publisher page 202 is a representation of objects included in the publisher page 202. For example, the DOM associated with the publisher page 202 may include a tree representation such as illustrated in a partial DOM 218. The partial DOM 218 includes, for example, an html node 220, a head node 222, a body node 224, a title node 226, a header node 228, and a paragraph node 230.

Firing of the pixel 208 can include traversing the DOM associated with the publisher page 202 and determining one or more topics associated with the publisher page 202 based on the traversal. Firing of the pixel 208 can include, for example, evaluating DOM nodes including evaluating properties of objects, and determining one or more topics based on the evaluated properties. For example, an identified topic can be associated with a keyword that appears at least a threshold (e.g., three) times in a property of an object included in the DOM associated with the publisher page 202. As another example, firing of the pixel 208 can include evaluation of other data, such as data used in a scripting engine or layer. For example, state of a scripting engine, such as variables, can be determined and used for topic identification. As another example, script code can be parsed and/or evaluated to determine topics.

The identified topics can be included in the data 212 provided to the content server 210. The content server 210 can store the received user/user device identifier associated with the user device 206 in an audience data structure 232 that is stored in an audiences database 234. The user/user device identifier can be stored in the audience data structure 232 in association with the topics determined for the publisher page 202. Storing user/user device identifiers is described in more detail below.

In some implementations, the audience data structure 232 represents a semantic space that includes a plurality of topic clusters. Each topic cluster can include one or more topics. The audience data structure 232 can be implemented, for example, as a tree structure (e.g., as shown) and a topic cluster can be implemented as a branch of the tree structure. For example, a sports topic cluster can include nodes 236, 238, 240, 242, 244, and 246, relating to sports, team sports, basketball, football, baseball, and soccer, respectively. A node situated higher in the audience data structure 232 or higher in a particular branch represents a topic that is more general than topics represented by nodes that are situated lower in the audience data structure 232 or a particular branch. For example, the sports topic represented by the node 236 is more general than the team sports topic represented by the node 238, and the team sports topic is more general than the basketball topic represented by the node 240.

In some implementations, a topic cluster can be defined as a node and one or more ancestors of the node. For example, a topic cluster can be defined as the node 240 relating to basketball and all ancestor nodes of the node 240. For example, the nodes in the cluster can be the nodes 240, 238, and 236. In some implementations, a topic cluster can be defined as a node and a predetermined number of ancestor nodes. For example, when the predetermined number is one, a topic cluster can be defined as the node 242 relating to football and the node 238 relating to team sports (e.g., the node 238 is an immediate ancestor of the node 242).

Determining the topics related to a resource such as the publisher page 202 can include determining one or more topic clusters for the resource. For example, one or more topic clusters can be determined based on a topic determined for the resource. For example, as mentioned, the topics determined for the publisher page 202 can include sports, basketball, football, and baseball. Three topic clusters can be identified, including, for example, a first cluster that includes the nodes 242, 238, and 236, a second cluster that includes the nodes 244, 238, and 236, and a third cluster that includes the nodes 240, 238, and 236. In this example, the nodes 238 and 236 are common among the three identified clusters.

In response to determining the identified topics and/or topic clusters, the user/user device identifier associated with the pixel firing can be stored in association with the identified topics and/or topic clusters and with the publisher 204 in the audience data structure 232. For example, the user/user device identifier (e.g., "usr111") can be stored, as shown, in the nodes 236, 238, 240, 242, and 244, in association with a publisher identifier of "PubA" that identifies the publisher 204.

In some implementations, a probability is determined that represents a likelihood that a publisher page should be associated with a determined topic. The probability can be based, for example, on a number of occurrences of topic-related keywords and/or on prominence of topic-related keywords (e.g., whether a keyword appears in a title or header). When the probability is greater than a threshold, the user/user device identifier can be stored in association with a determined topic and/or topic cluster in the audience data structure 232. When the probability is not greater than the threshold, the user/user device identifier is not stored in the audience data structure in association with the determined topic.

For example, a publisher page 248 of a publisher 250 (e.g., "publisher B") is displayed on a user device 252. The publisher page 248 includes or is otherwise associated with a pixel 254. The content server 210 can receive pixel-firing data 256 in response to the firing of the pixel 254. The content server 210 can, in response to receiving the pixel-firing data 256, determine one or more topics associated with the publisher page 248, such as "shoes", "basketball", "soccer", "basketball shoes", and "soccer shoes".

The content server 210 can determine, for each topic, a probability that the publisher page 248 should be associated with the topic. For example, the content server 210 can determine probabilities of P1, P2, P3, P4, and P5 (e.g., where P1, P2, . . . , P5 are predefined probabilities) for the topics of shoes, basketball, soccer, basketball shoes, and soccer shoes, respectively. When the threshold is, for example, P6 (e.g., where P6 is a predefined probability), the content server 210 can determine to store a user/user device identifier associated with the user device 252 in the audience data structure 232, in association with the publisher 250 and a respective topic when the probability for the respective topic is greater than P6. For example, a "usr122" user/user device identifier is stored in association with a publisher identifier of "PubB" in nodes 258, 260, and 262 corresponding to topics of shoes, soccer shoes, and basketball shoes, respectively based on the probabilities for those topics being greater than the threshold. The user/user device identifier is not stored in the nodes 240 and 246 corresponding to the topics basketball and soccer based on the probabilities for those topics not being greater than the threshold. In some implementations, the determined probability is stored along with the user identifier. For example, the probability of P1 is stored with the user/user device identifier "usr122" in the node 258 for the shoes topic. Although a single example threshold of P6 is used in the example of FIG. 2, in some implementations, different thresholds can be used for different topics.

Data for multiple publishers can be stored in a same audience data structure, as illustrated in the audience data structure 232. For example, stored user/user device identifiers can be stored in association with (e.g., keyed-by, grouped-by) publisher identifier as well as being associated with one or more topics. In other words, a same semantic space can be used for multiple publishers with the data being able to be queried for a particular publisher. As another example, a separate audience data structure can be stored for each publisher.

In some implementations, in response to receiving the data 212, the content server 210 queries a rules database 264 using the publisher identifier included in the data 212 for rules that are associated with the publisher 202. For example, the content server 210 can determine that a "Rule1" rule and a "Rule2" rule are associated with the publisher 202 (e.g., as shown in example rule data 266).

The content server 210 can evaluate the determined rules to determine whether one or more actions are to be performed in response to receiving the data 212. For example, the content server 210 can evaluate the Rule1 rule which states that "For each topic, add user to topic-node". In this example, the Rule1 rule is a template rule in which "topic" is a placeholder. For each identified topic, the user/user device identifier is added to a node corresponding to the topic.

A rule can refer to a probability associated with a topic. For example, a "Rule3" rule included in the example rule data 266 and associated with publisher B is defined as "If probability of topic >"probability-X" (e.g., where "probability-X" is some predefined probability value), add user to topic-node". In this case, the "for each topic" aspect can be implied, and the Rule3 rule can be evaluated for each identified topic. When the probability of a particular topic is greater than "probability-X", the user/user identifier (e.g., for the user device 252) is added to a node corresponding to the topic.

A rule can be predefined by the content server 210 and used by default when a topic is identified in response to a pixel firing. For example, Rule1 or Rule3 can be a default rule for one or more publishers. In some implementations, a rule can be selected and/or configured by a publisher. For example, a publisher can select one or more predefined rules and/or can define one or more custom rules, such as using a publisher user interface 268.

A custom or predefined rule can be defined using one or more functions, operators and/or conditions. For example, the example rule data 266 includes a "Rule4" rule for a "Publisher C" publisher which states that "If topics include baseball, add user to baseball-node, sports-node." For example, if the topics determined in response to a pixel firing include baseball, the user/user device identifier of the user device associated with the pixel firing can be added to both a node associated with a topic of baseball and a more general node associated with a topic of sports.

As another example, the example rule data 266 includes a "Rule5" rule which states that "If topics include cars and not luxury, add user to economy-car-node". For example, when the determined topics include a topic of cars and do not include a topic of luxury, a user/user device identified associated with the pixel firing can be added to a node associated with an economy-car topic. As yet another example, Rule2 states that "If ancestors (topic) includes sports, add user to topics-in-range(sports, topic)". For example, when a determined topic has an ancestor of (e.g., is a descendant of) a topic of sports, a user/user device identifier associated with the pixel firing can be added to a node associated with the sports topic, a node associated with the topic, and any intervening nodes. For example, when the Rule2 rule is evaluated in response to the content server 210 receiving the pixel-firing data 212, the content server 210 can determine that the determined topic of baseball has an ancestor topic of sports. In response to such a determination, the user/user device identifier associated with the user device 206 can be added to the nodes 236, 238, and 244, corresponding to sports, team-sports, and baseball topics, respectively.

In some implementations, an action can be performed other than adding a user/user device identifier to a node associated with a topic. For example, a user/user identifier can be removed from a node associated with a topic. For example, a publisher may wish to build a list of users who have shown interest in a first topic but not interest in a second topic. For instance, a rule can specify that if a topic of a publisher page visited by a user is or is associated with luxury cars, then remove a user/user device identifier associated with the user from an economy-cars node if the user/user device identifier is included in the economy-cars node.

A publisher, such as the publisher 204, can query the content server 210 to identify a segment of the audience of users stored for the publisher in the audience data structure 232. For example, the publisher 204 can specify a query using the publisher user interface 268 and the query can be provided to the content server 210 (e.g., as illustrated by a query 270). The content server 210 can classify the query such as by identifying one or more topics and/or topic clusters in the audience data structure 232 based at least in part on terms of the query. The content server 210 can determine a set of users that are in an audience segment defined by the query based on the classifying such as by identifying user/user identifiers associated with the identified one or more topics or topic clusters. The set of users can be returned to the publisher 204 in response to the query 270, such as illustrated by a returned audience segment 272.

The publisher 204 can use the audience segment 272 for a variety of purposes. For example, the publisher 204 can use the audience segment 272 to define a content campaign (e.g., using the publisher user interface 268 or another interface), such as a content campaign managed by the content server 210 or another content system. The audience segment 272 can be used, for example, as selection criteria for the campaign. For example, the publisher 204 can provide content items for the campaign and can configure the campaign such that the provided content items are eligible to be presented when a content-serving opportunity arises that is associated with a user/user device identifier that is included in the audience segment 272.

For example, a search results page 274 can be presented on the user device 206. A content request 278 can be provided to the content server 210 for a content slot 276 included in the search results page 274. The content server 210 can determine that a publisher-provided content item included in a content campaign associated with the publisher 204 is eligible to be provided in response to the content request 278, based at least in part on a user/user device identifier associated with the user device 206 being included in the content request 278 and included in the audience segment 272 that was used as selection criteria for the content campaign. In some implementations, the content server 210 uses a probability stored with the user identifier to determine whether to serve the publisher-provided content item for the content slot 276. For example, the selection criteria can specify that the publisher-provided content item is an eligible content item when the probability is more than a threshold. As another example, the content server 210 can adjust an auction bid for the publisher-provided content item based on the probability (e.g., a higher probability can result in a higher bid).

Figure 3:
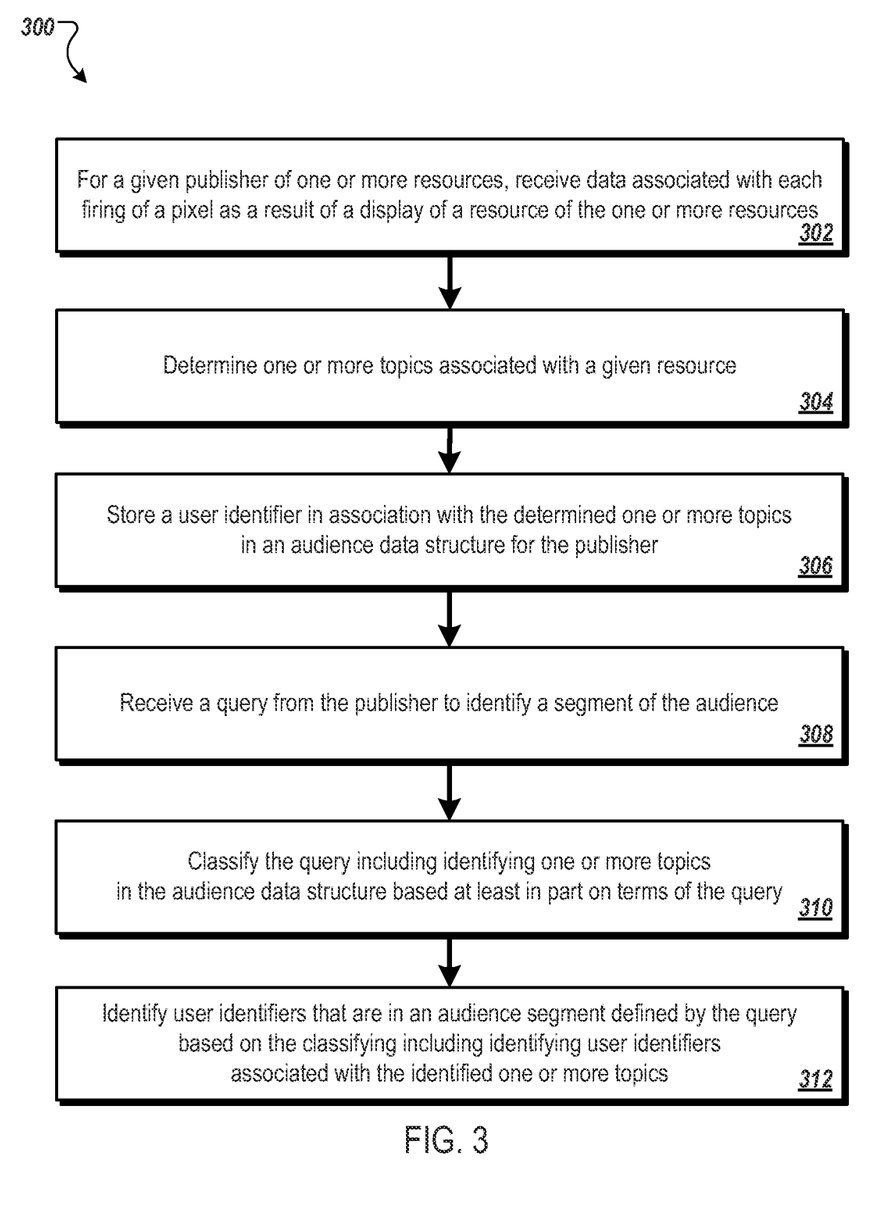
FIG. 3 is a flowchart of an example process for creating and querying for audience data.

The content server 210 can select the publisher-provided content item in response to the content request 278 and can provide the selected content item to the user device 206 (e.g., as illustrated by a content item 282), for presentation in the content slot 276 (e.g., as illustrated by a presented content item 284). In FIG. 3 is a flowchart of an example process 300 for creating and querying for audience data. The process 300 can be performed, for example, by the content management system 110 described above with respect to FIG. 1 and/or content server 210 described above with respect to FIG. 2.

For a given publisher of one or more resources, data associated with each firing of a pixel as a result of a display of a resource of the one or more resources is received (302). The data can include an identifier for the publisher, a URL or other type of resource identifier associated with the resource, and a user identifier associated with a user device on which the resource was displayed, among other information. Data can be received as a result of the pixel firing that includes information for classifying the resource. For example, a title of the resource or a portion of the resource can be received. A portion can include all headings elements, heading elements at or above a threshold level of significance, or a first N (e.g., two) paragraphs of the resource, to name a few examples. The portion can include, for example, information extracted from a document object model (DOM) associated with the resource. For example, the extracted information can be information extracted from the DOM by execution of code associated with the pixel.

One or more topics associated with a given resource are determined (304). When data is received that includes information for classifying the resource, the one or more topics can be determined based on the received data. For example, the one or more topics can be determined from a received title or received portion of the resource. As another example, the one or more topics can be determined based on information extracted from the DOM associated with the resource. In some implementations, the one or more topics can be determined based on evaluating a stored representation of the resource that has been generated based on previous crawling of the resource. For example, the stored representation can be retrieved using the URL of the resource. In some implementations, determining the topics includes identifying a semantic space that includes a plurality of topic clusters, wherein each topic cluster includes one or more topics that are within a predetermined distance in the semantic space. One or more topic clusters can be determined for the resource, based on the determined one or more topics. In some implementations, a probability that the given resource should be associated with one of the determined one or more topic clusters is determined.

The user identifier is stored in association with the determined one or more topics in an audience data structure for the publisher (306). The audience data structure is indicative of an audience that has been presented content of the publisher on the one or more resources. When one or more topic clusters are determined, the user identifier can be stored in association with the determined one or more topic clusters. When a probability is determined, the probability can be stored along with the user identifier in a given topic cluster.

A query from the publisher to identify a segment of the audience is received (308). The query can include, for example, one or more query terms, wherein a query term can identify a topic and/or a characteristic or behavior of a user. In some implementations, the publisher is an advertiser, the one or more web resources are associated with a website of the advertiser, and the query identifies a behavior of a user that visited the website.

The query is classified including identifying one or more topics in the audience data structure based at least in part on terms of the query (310). In some implementations, one or more topic clusters in the semantic space are determined based on terms of the query.

Users that are in an audience segment defined by the query are identified based on the classifying including identifying user identifiers associated with the identified one or more topics (312). When one or more topic clusters are determined, user identifiers that are associated with the determined one or more topic clusters can be determined. The identified user identifiers can be returned to the publisher as an audience segment query result. The publisher can use the query result, such as for determining selection criteria for a campaign or for some other purpose.

Other configurations and implementations are possible. For example, a content management system can be configured as a CDN (Content Delivery Network) or proxy. The CDN can be configured so that a request for publisher content from a user-device is delivered to the CDN rather than the publisher. The publisher can, for example, upload content in advance to the CDN or the CDN can request content on demand from the publisher. In this example, since user requests for publisher content are received by the CDN, the CDN can build a dataset that includes entries that include, for example, a user identifier, a timestamp, and a URL or other resource identifier for the publisher content. The CDN can determine topics associated with each publisher resource, such as when the publisher provides the resource to the CDN. In this example implementation, use of pixels and resource crawling are not required.

Figure 4:
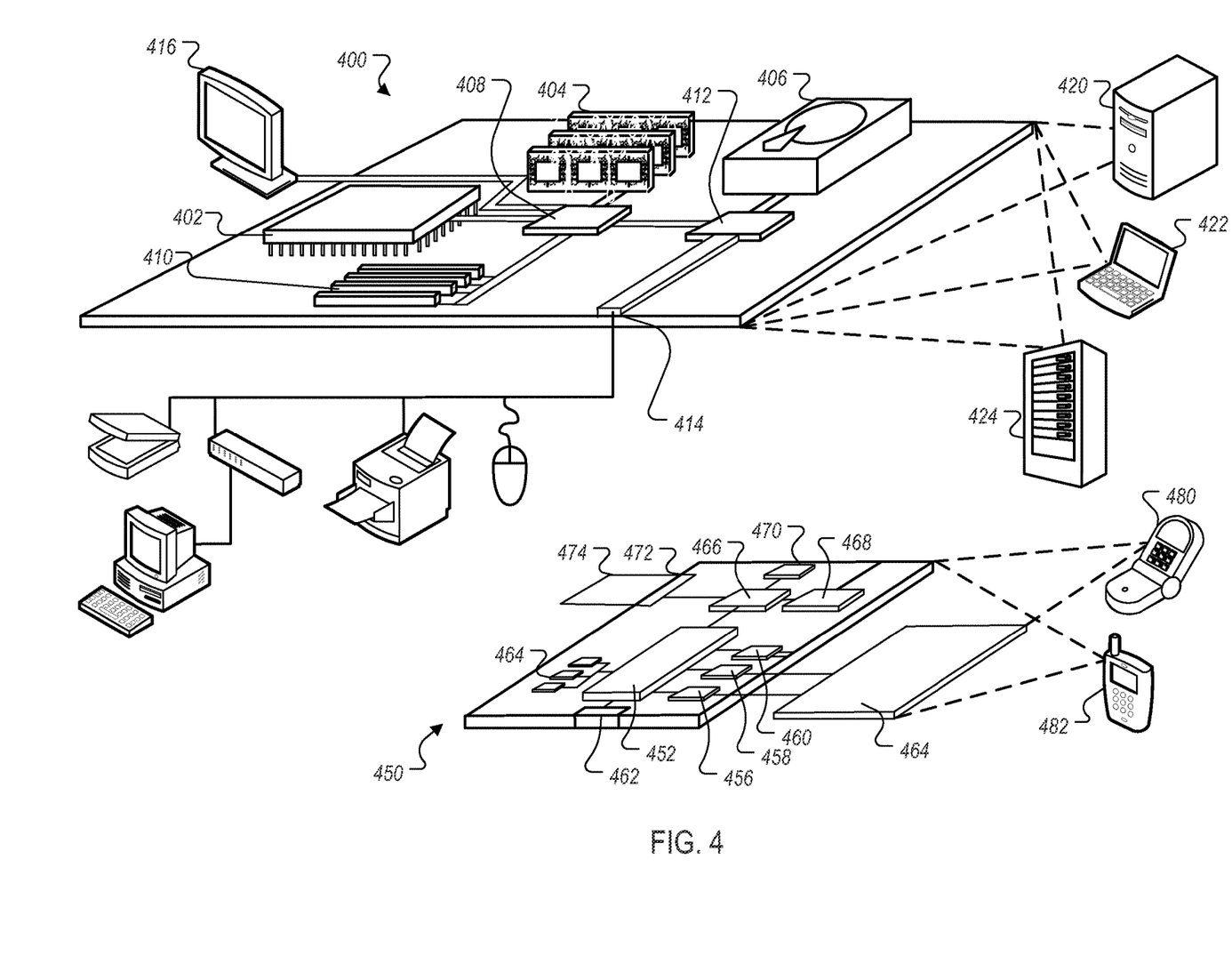
FIG. 4 is a block diagram of computing devices that may be used to implement the systems and methods described in this document, as either a client or as a server or plurality of servers.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be illustrative only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. The computer-readable medium is not a propagating signal. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of duties is illustrative only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication (e.g., via a docking procedure) or for wireless communication (e.g., via Bluetooth® or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a SIMM card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth®, WiFi, or other such transceiver (not shown). In addition, GPS receiver module 470 may provide additional wireless data to device 450, which may be used as appropriate by applications running on device 450.

Device 450 may also communicate audibly using audio codec 460, which may receive spoken information from a user and convert it to usable digital information. Audio codex 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A method comprising:
   providing a pixel that causes a client device to traverse a document object model (DOM) of a resource provided by a given publisher when the resource is presented by the client device;
   collecting, from each particular client device among multiple different client devices that visit the resource, data extracted from the resource by the particular client device during the traversal of the DOM that occurs in response to the pixel firing when the resource is presented by the particular client device, wherein the data extracted specifies different content that was presented to the client devices over time;
   storing, for each pixel firing and in a data structure, the collected data including storing, data specifying content that is presented on the resource when the resource is presented by each of the client devices, an identifier for the publisher, a URL of the resource, and a given user identifier of the particular client device on which the resource of the given publisher was displayed when the pixel fired;
   determining, for each pixel firing, topics of the different content presented on resource over time based on the data specifying content that was presented on the resource that was extracted from the DOM by the pixel firing;
   associating, in the data structure and for each pixel firing, the given user identifier included in the data with one or more of the determined topics based on the given user identifier being included in the collected data that specified the content presented on the resource that was used to determine the topics;

receiving a query from the publisher to identify a segment of an audience that has visited one or more pages of the publisher's website that are related to a given topic;

in response to receiving the query:

identifying one or more matching topics in the data structure that are relevant to the given topic specified by the query;

identifying user identifiers that are associated with the matching topics in the data structure; and providing a given content item to users identified by the user identifiers that are associated with the matching topics in the data structure based on the association with the matching topic in the data structure and the query from the given publisher.

2. The method of claim 1 wherein at least one of the one or more resources is a web resource.

3. The method of claim 1 wherein at least one of the one or more resources is an application presented on a mobile device.

4. The method of claim 2 wherein receiving data extracted from the resource includes receiving one or more of the title or a portion of the resource.

5. The method of claim 1 wherein determining, for each pixel firing, topics includes identifying a semantic space that includes a plurality of topic clusters, each topic cluster including one or more topics that are within a predetermined distance in the semantic space and determining one or more topic clusters for the resource and wherein associating includes storing the user identifier in association with the determined one or more topic clusters.

6. The method of claim 5 wherein determining the one or more topic clusters includes determining a probability that the resource should be associated with one of the determined one or more topic clusters and associating, in the data structure, the given user identifier with a specific topic cluster.

7. The method of claim 6 wherein associating, in the data structure, the given user identifier with the specific topic cluster includes storing the probability along with the given user identifier in a given topic cluster.

8. The method of claim 7 further comprising using the probability to determine whether to serve content to a user upon identifying a serving opportunity for the user having a specific user identifier in the audience.

9. The method of claim 8 wherein determining whether to serve includes adjusting a bid for use in an auction associated with the opportunity.

10. The method of claim 1 further comprising using the query to determine selection criteria for a campaign.

11. The method of claim 1 wherein the method is performed by an entity other than the publisher.

12. The method of claim 2 wherein the publisher is an advertiser, the resource is included in a website of the advertiser, and the query identifies a behavior of a user that visited the website.

13. The method of claim 1, wherein the data structure includes multiple entries that include one or more of the given user identifiers and the URL of the resource, with each entry including a different topic that was included in the resource at a time the resource was presented on a client device of the user.

14. A system comprising:

one or more processors; and one or more memory elements including instructions that when executed cause the one or more processors to perform operations including:

providing a pixel that causes a client device to traverse a document object model (DOM) of a resource provided by a given publisher when the resource is presented by the client device;

collecting, from each particular client device among multiple different client devices that visit the resource, data extracted from the resource by the particular client device during the traversal of the DOM that occurs in response to the pixel firing when the resource is presented by the particular client device, wherein the data extracted specifies different content that was presented to the client devices over time;

storing, for each pixel firing and in a data structure, the collected data including storing, data specifying content that is presented on the resource when the resource is presented by each of the client devices, an identifier for the publisher, a URL of the resource, and a given user identifier of the particular client device on which the resource of the given publisher was displayed when the pixel fired;

determining, for each pixel firing, topics of the different content presented on resource over time based on the data specifying content that was presented on the resource that was extracted from the DOM by the pixel firing;

associating, in the data structure and for each pixel firing, the given user identifier included in the data with one or more of the determined topics based on the given user identifier being included in the collected data that specified the content presented on the resource that was used to determine the topics;

receiving a query from the publisher to identify a segment of an audience that has visited one or more pages of the publisher's website that are related to a given topic;

in response to receiving the query:

identifying one or more matching topics in the data structure that are relevant to the given topic specified by the query;

identifying user identifiers that are associated with the matching topics in the data structure; and providing a given content item to users identified by the user identifiers that are associated with the matching topics in the data structure based on the association with the matching topic in the data structure and the query from the given publisher.

15. A computer program product tangibly embodied in a computer-readable storage device and comprising instructions that, when executed by a processor, cause the processor to perform operations including:

providing a pixel that causes a client device to traverse a document object model (DOM) of a resource provided by a given publisher when the resource is presented by the client device;

collecting, from each particular client device among multiple different client devices that visit the resource, data extracted from the resource by the particular client device during the traversal of the DOM that occurs in response to the pixel firing when the resource is presented by the particular client device, wherein the data extracted specifies different content that was presented to the client devices over time;

storing, for each pixel firing and in a data structure, the collected data including storing, data specifying content that is presented on the resource when the resource is presented by each of the client devices, an identifier for the publisher, a URL of the resource, and a given user identifier of the particular client device on which the resource of the given publisher was displayed when the pixel fired;

determining, for each pixel firing, topics of the different content presented on resource over time based on the data specifying content that was presented on the resource that was extracted from the DOM by the pixel firing;

associating, in the data structure and for each pixel firing, the given user identifier included in the data with one or more of the determined topics based on the given user identifier being included in the collected data that specified the content presented on the resource that was used to determine the topics;

receiving a query from the publisher to identify a segment of an audience that has visited one or more pages of the publisher's website that are related to a given topic;

in response to receiving the query:

identifying one or more matching topics in the data structure that are relevant to the given topic specified by the query;

identifying user identifiers that are associated with the matching topics in the data structure; and providing a given content item to users identified by the user identifiers that are associated with the matching topics in the data structure based on the association with the matching topic in the data structure and the query from the given publisher.

* * * * *

UNITED STATES PATENT AND TRADEMARK OFFICE
CERTIFICATE OF CORRECTION

PATENT NO. : 10,817,884 B2
APPLICATION NO. : 14/273104
DATED : October 27, 2020
INVENTOR(S) : Reeves It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1188 days.

Signed and Sealed this
Third Day of May, 2022

Katherine Kelly Vidal
*Director of the United States Patent and Trademark Office*